Oct. 10, 1961  D. PATTERSON  3,003,276
FLUTTERING TYPE ARTIFICIAL LURE
Filed Feb. 26, 1959
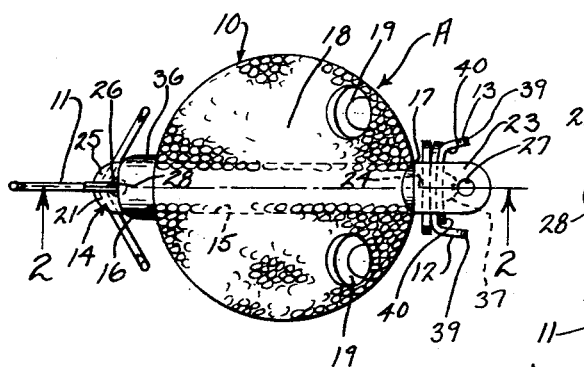
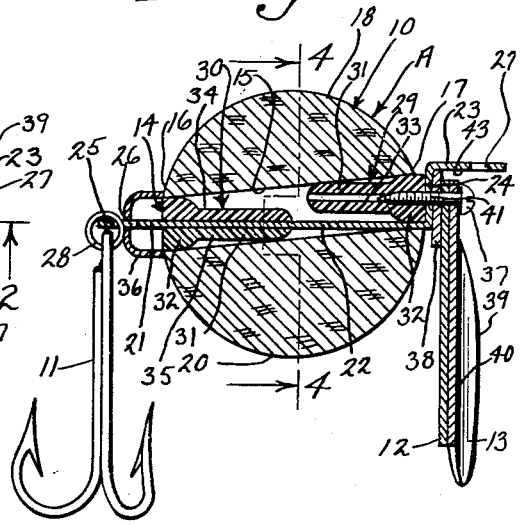
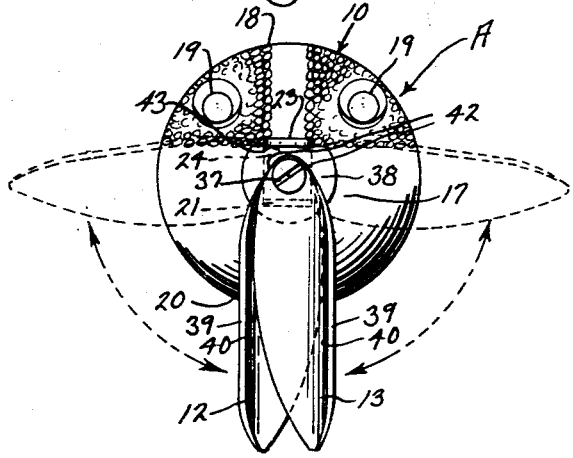
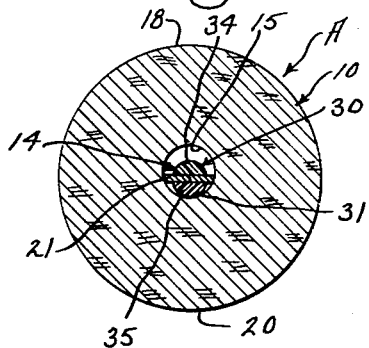
INVENTOR
DELBERT PATTERSON
BY *Wright and Wright*
ATTORNEYS United States Patent Office 3,003,276
Patented Oct. 10, 1961

3,003,276
FLUTTERING TYPE ARTIFICIAL LURE
Delbert Patterson, Wild Rose, Wis.
Filed Feb. 26, 1959, Ser. No. 795,748
3 Claims. (Cl. 43—42.15)

This invention appertains to fishing baits and, more particularly, to an artificial lure of the surface bait type.

In the past, there has been developed numerous types of artificial lures, both of the surface type, i.e. baits that float or move along the upper surface of the water and of the type adapted to move through the water to simulate various types of fish or other water life. The main object of all of the baits is to simulate the movements of natural life found in and around the water and, therefore, some movement is usually incorporated in the bait to attract the attention of the fish. For example, spinners are used so that the light reflecting in the water off the spinner attracts the fish as the lure moves through the water and the lure is intended to simulate the light reflecting from minnows and the like.

However, particularly in the so-called game fish of the bass family, pickerel family and the like, a surface bait has been found quite effective in that these fish feed from various insects and small animal life that may fall onto the surface of the water. To my knowledge, no bait has been developed which simulates either the movements of a small mammal swimming in the water or the movements of a large insect on the surface of the water. Further, no surface bait, to my knowledge, has been developed which incorporates the advantages of a spinner type bait. It is also an object of most surface type artificial lures to cause a noise or disturbance to simulate movement of an entrapped insect or mammal so that the game fish will rise to the bait.

Therefore, a primary object of my present invention is to provide an artificial lure of the surface type which, when moved through the water, will make noise and simulate the movements of a swimming mammal or the beating of the wings of an entrapped insect.

A further object of my present invention is to provide an artificial lure of the surface type in which the main body is formed from a cork or light floatable material painted and lacquered to resemble a large bug or small mammal having means at one end to attach the hook and means at the forward end to carry the movable wings or blades.

Another object of my present invention is to provide novel depending movable blades, fins or wings which will hang in a perpendicular at rest position by force of gravity but which are so shaped that forward motion through the water or a strong movement of air will cause the wings to assume a horizontal position, these wings continually moving from a horizontal to a perpendicular position toward and away from one another as the bait is moved through the water thus simulating a swimming mammal or the beating of the wings of a large insect on the surface of the water.

A still further object of my present invention is to provide novel means for wedging the hook holding and blade holding means to the body of the bait so that the hook and blades will be firmly held to the bait and cannot become loose or detached therefrom.

A salient feature of my novel invention resides in providing an aperture or bore through the axial center of the cork body and in providing means co-acting with the bore for securing the hook and blade holding means and for attaching a line thereto.

Still another object of my present invention is to provide a simple, practical and reliable construction that is economical to manufacture, easy to assemble and positive in its operation.

With the above and other objects in view which will more readily appear as the nature of the invention is better understood, the same consists in the novel construction, combination and arrangement of parts hereinafter more fully described, illustrated and claimed.

A preferred and practical embodiment of my invention is shown in the accompanying drawing, in which:

FIGURE 1 is a top plan view of my novel surface artificial lure illustrating one way in which the lure can be painted to simulate a large bug or small mammal;

FIGURE 2 is a longitudinal vertical section through the lure taken on the line 2—2 of FIGURE 1 looking in the direction of the arrows and illustrating details in construction for firmly holding the hook and blade means to the body of the lure;

FIGURE 3 is a front elevational view of my lure showing in full lines the perpendicular position of the blades and in dotted lines the horizontal position assumed by the blades and illustrating by arrows the movement of the blades as the lure is moved along the surface of the water with the blades protruding below the surface of the water, and FIGURE 4 is a vertical transverse section taken on the line 4—4 of FIGURE 2 of the drawing and illustrating further details in the construction and the securing means of the lure.

Referring now to the drawing in detail wherein similar reference characters designate corresponding parts throughout the several views, the letter A generally indicates one type of my improved artificial surface lure and the same includes broadly, a body 10 preferably made from cork or other light floatable material, hooks 11 secured to the rear portion of the body 10, blades 12 and 13 respectively, pivotally mounted at the forward end of the body and means 14 for securing the hooks 11 and the blades 12 and 13 firmly to the body. The means 14 also provides for attachment of the lure to a fish line (not shown).

As previously brought out, the body 10 is preferably made from cork but may be made of any floatable material and in any desired shape although in the preferred construction, the body is formed circular or in the shape of a sphere or ball through the axial center of which I provide an elongated aperture or way 15 and this aperture opens out on the rear end 16 and forward end 17 of the body 10.

The upper surface 18 of the body 10 is painted to resemble a large bug or small mammal and may be provided adjacent the forward end thereof with eyes 19. The lower body portion 20 is preferably painted a solid color and also this paint is preferably covered with a lacquer or some type of water-proofing material.

A salient feature of my present invention resides in the construction of the blades or wings 12 and 13 as well as the novel means 14 for securing the wings 12 and 13 and the hooks 11 to the body 10. This means 14 includes a main piece 21 preferably formed from a single flat length of thin metal bent to provide an elongated flat strip 22 and a shorter parallel forwardly extending flat piece 23 joined by a length 24. The lengths 22 and 23 are at right angles to the length 24 and are integral therewith and the length 22 is of a sufficient dimension to extend entirely through the aperture 15 and to have a portion 25 protruding therefrom. The extreme rear portion of the length 22 is provided with an aperture 26 and the extreme forward portion of the length 22 is provided with an aperture 27. The aperture 26 is designed to receive a ring 28 to which the hooks 11 are attached. The ring 28 may be of the usual construction used to connect fish hooks to swivels and fish lines and is of the split ring type so that the hook may be slid on and off of the ring. The aperture 27 is, of course, to receive the fish line (not shown) and to attach the lure to whatever type of fishing rig is used.

In order to firmly hold the flat strip 22 in proper position in relation to the body 10, I provide a pair of pegs 29 and 30, respectively, and these pegs are elongated as shown in FIGURE 2 and rounded as shown by the transverse section of FIGURE 4. Each peg 29 and 30, therefore, is provided with the elongated body portion 31 and an enlarged head 32, the outer circumference of the head 32 being of the same dimension as the inner circumference of the cylindrical aperture or way 15. Both pegs 29 and 30 are made from a resilient compressible or expandable material such as latex, rubber, and the like, and the peg 29 is provided with a bore 33 through its axial center as shown more particularly in FIGURE 2 of the drawing. The peg 30 is slit down its axial center to form two identical mating sections 34 and 35, respectively, and as illustrated more particularly in FIGURE 4 of the drawing, these sections lie on either side of the flat strip 22 of the main piece 21.

In assembling the lure or bait, the piece 21 is slipped through the axial way 15 from the forward end 17 thereof so that the rear portion extends beyond the rear end 16 of the body 10. The peg 30 is then pushed into position with section 34 lying on the upper surface of strip 22 and section 35 lying on the lower surface and inasmuch as the head thereof is of approximately the same dimension as the inner circumference of the way 15, the additional thickness of the strip 22 will firmly wedge the peg 30 in place and hold the rear portion of the strip 22 firmly in position. Prior to placing the strip 22 in the way 15, the peg 29 is set in the position shown in FIGURE 2 and a screw 37 is threaded through openings provided in the blades 12 and 13 and through an opening provided in a guard 38 and extends into the head 32 of the peg 29. The outer circumference of the screw is larger than the axial bore 33 and, therefore, this screw will tend to spread the head and firmly wedge the same in the forward portion of the way 15. A cap or guard 36 having a slit on its rear portion 37 to receive the end 25 of the strip 22 is then placed over the strip and completely encloses the rear portion of the way 15 as shown more particularly in FIGURES 1 and 2 of the drawing. The ring 28 is then slipped through the aperture 26 and this ring not only serves to support the hooks 11 but also to prevent the rearward movement of the cap 36. Thus the fastening means 14 firmly secures the hooks 11 and wings or blades 12, 13 to the body 10 in a novel manner. Further, the guard 38 consists of a flat piece of metal held between the blades 12 and 13 and the length 24 so as to insure the free pivoting of the blades 12 and 13.

The blades 12 and 13 are formed in a novel way so that the flow of air or water impinging against the blades will force the blades upward to the dotted line position shown in FIGURE 3 and thus cause a fluttering motion of the blades as the lure is pulled through the water. To accomplish this, I provide the outer edges of each blade 12 and 13 with an outwardly curved length 39 as clearly shown in FIGURES 1, 2 and 3 of the drawing and it is obvious that the inner curved portions 40 of each blade will cause any forward motion to transmit force to the outwardly extending portions 39 and thus move the blades about the pivot of the screw 37 and toward their dotted line position, FIGURE 3. As the forward motion of the lure is slightly diminished, the blades will return by gravity to their full line position and thus the fluttering of the blades can be easily controlled.

In order to limit the upward movement of the blades, the pivot points 41 are located at the center of the length 24 and just under the flat forwardly extending length 23 so that the surface 42 of each blade will contact the lower surface 43 of the length 23 and the upward movement will be limited as shown in FIGURE 3 of the drawing.

From the foregoing, it is believed that the features and advantages of my invention will be readily apparent to those skilled in the art and it will, of course, be understood that changes in the form, proportion and minor details of construction may be resorted to without departing from the spirit of the invention or the scope of the appended claims.

I claim:

1. In an artificial lure of the surface bait type, a body of light floatable material having a forward portion and a rear portion and an elongated aperture through its axial center opening out on said forward and rear portions, fish hooks adjacent said rear portion of said body, a pair of pivoted blades adjacent said forward portion of said body, and attaching means associated with said body and aperture to firmly secure said hooks and to pivotally hold said blades to said body, said attaching means including a flat strip received in said elongated aperture and extending entirely therethrough and having a portion protruding beyond said forward and rear body portions, said forwardly projecting portion being adjacent and above the point where said blades are pivoted, whereby the upward movement of said blades is restricted, and headed pegs received in said elongated aperture of a size and configuration to wedge said strip to said body, said hooks and said blades being secured to the respective rear and forward portions of said strip.

2. In an artificial lure of the surface bait type a body of light floatable material having a forward portion and a rear portion and an elongated aperture through its axial center opening out on said forward and rear portions, fish hooks adjacent said rear portion of said body, a pair of pivoted blades adjacent said forward portion of said body, and attaching means associated with said body and aperture to firmly secure said hooks and to pivotally hold said blades to said body, said attaching means including a flat strip received in said elongated aperture and extending entirely therethrough and having a portion protruding beyond said forward and rear body portions, said forwardly projecting portion being adjacent and above the point where said blades are pivoted, whereby the upward movement of said blades is restricted, said pivoted blades each having an outwardly and forwardly curved length adjacent the outer edge thereof forming a curved surface, whereby forward motion of the lure through the water will cause a fluttering movement of said blades, and headed pegs received in said elongated aperture of a size and configuration to wedge said strip to said body, said hooks and said blades being secured to the respective rear and forward portions of said strip.

3. In an artificial lure of the surface bait type, a body of light floatable material having a forward portion and a rear portion and an elongated aperture through its axial center opening out on said forward and rear portions, fish hooks adjacent said rear portion of said body, a pair of pivoted blades adjacent said forward portion of said body, and attaching means associated with said body and aperture to firmly secure said hooks and to pivotally hold said blades to said body, said attaching means including a flat strip received in said elongated aperture and extending entirely therethrough and having a portion protruding beyond said forward and rear body portions, said forwardly projecting portion being adjacent and above the point where said blades are pivoted, whereby the upward movement of said blades is restricted, said pivoted blades each having an outwardly and forwardly curved length adjacent the outer edge thereof forming a curved surface, whereby forward motion of the lure through the water will cause a fluttering movement of said blades, and means cooperating with said strip to secure said strip against movement in relation to said body, said hooks and said blades being secured to the respective rear and forward portions of said strip.

References Cited in the file of this patent

UNITED STATES PATENTS

| | | |
|---|---|---|
| 664,476 | Hall | Dec. 25, 1900 |
| 1,522,019 | Mantz | Jan. 6, 1925 |
| 1,977,141 | Pflueger | Oct. 16, 1934 |
| 2,127,639 | Breuer | Aug. 23, 1938 |
| 2,437,523 | Haan | Mar. 9, 1948 |
| 2,563,386 | Wight | Aug. 7, 1951 |
| 2,570,100 | Collins | Oct. 2, 1951 |
| 2,745,206 | Gaw | May 15, 1956 |
| 2,750,702 | Hartig | June 19, 1956 |